(12) United States Patent
Yang et al.

(10) Patent No.: US 10,637,678 B2
(45) Date of Patent: Apr. 28, 2020

(54) FACILITATING PORTABLE, REUSABLE, AND SHAREABLE INTERNET OF THINGS (IOT)-BASED SERVICES AND RESOURCES

(71) Applicant: INTEL CORPORATION, Santa Clara, CA (US)

(72) Inventors: Shao-Wen Yang, Hillsboro, OR (US); Nyuk Kin Koo, Bukit Mertajam (MY); Yen-Kuang Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 543 days.

(21) Appl. No.: 14/864,757

(22) Filed: Sep. 24, 2015

(65) Prior Publication Data
US 2017/0093593 A1    Mar. 30, 2017

(51) Int. Cl.
| H04L 12/28 | (2006.01) |
| H04W 4/70 | (2018.01) |
| H04L 29/08 | (2006.01) |

(52) U.S. Cl.
CPC ...... *H04L 12/2816* (2013.01); *H04L 12/2814* (2013.01); *H04L 12/2818* (2013.01); *H04L 67/12* (2013.01); *H04W 4/70* (2018.02)

(58) Field of Classification Search
CPC ............. H04L 12/2816; G05B 19/05; G05B 2219/2642
USPC ........................................................ 700/275
See application file for complete search history.

(56) References Cited

U.S. PATENT DOCUMENTS

| 2006/0277323 A1 | 12/2006 | Joublin et al. |
| 2007/0156265 A1* | 7/2007 | McCoy ............. G05B 19/0426 700/83 |

(Continued)

FOREIGN PATENT DOCUMENTS

| WO | 2014-124318 A1 | 8/2014 |
| WO | 2014-190053 A1 | 11/2014 |

(Continued)

OTHER PUBLICATIONS

International Search Report issued in PCT Application No. PCT/US2015/052361, dated Jun. 23, 2016, 9 pages.

(Continued)

*Primary Examiner* — James J Lee
*Assistant Examiner* — Michael W Choi
(74) *Attorney, Agent, or Firm* — Grossman, Tucker, Perreault & Pfleger, PLLC

(57) ABSTRACT

A mechanism is described for facilitating portable, reusable, and shareable Internet of Things-based services and resources according to one embodiment. A method of embodiments, as described herein, includes wherein receiving a recipe request for selecting a recipe relating to Internet of Things (IoT) services, where selecting includes at least one of searching the recipe and modifying the recipe. The method may further include selecting the recipe, where the recipe includes a set of resource requirements and business logic. The method may further include modifying the set of resource requirements, where the modified set of resource requirements is associated with the business logic to modify the recipe, and deploying the modified recipe at one or more computing devices, where the modified recipe to facilitate management for one or more IoT devices at one or more locations.

25 Claims, 12 Drawing Sheets

(56) References Cited

U.S. PATENT DOCUMENTS

| | | | |
|---|---|---|---|
| 2008/0004764 A1* | 1/2008 | Chinnadurai | G05B 23/0235 |
| | | | 701/31.4 |
| 2008/0147207 A1* | 6/2008 | D'Mura | G05B 19/056 |
| | | | 700/20 |
| 2012/0054650 A1* | 3/2012 | Bliss | G05B 19/042 |
| | | | 715/764 |
| 2012/0092727 A1 | 4/2012 | Furst et al. | |
| 2013/0219064 A1 | 8/2013 | Zhang et al. | |
| 2013/0246996 A1 | 9/2013 | Duggal et al. | |
| 2014/0108558 A1 | 4/2014 | Borzycki et al. | |
| 2014/0122642 A1 | 5/2014 | Hughes et al. | |
| 2015/0012669 A1 | 1/2015 | Hipp et al. | |
| 2015/0365480 A1* | 12/2015 | Soto | H04L 12/2827 |
| | | | 709/224 |
| 2016/0054023 A1* | 2/2016 | Baker | E04F 19/00 |
| | | | 307/31 |

FOREIGN PATENT DOCUMENTS

| | | | |
|---|---|---|---|
| WO | 2017-052624 | A1 | 3/2017 |
| WO | 2017-052632 | A1 | 3/2017 |

OTHER PUBLICATIONS

International Search Report issued in PCT Application No. PCT/US2015/052387, dated Jul. 22, 2016, 8 pages.

Gassara, Amal, et al.: "Towards a nulti-scale modeling for architectural deployment based on bigraphs", 7th European Conference on Software Architecture (ECSA), France, vol. 7957, Jul. 1-5, 2013, 8 pages.

* cited by examiner

US 10,637,678 B2

FACILITATING PORTABLE, REUSABLE, AND SHAREABLE INTERNET OF THINGS (IOT)-BASED SERVICES AND RESOURCES

FIELD

Embodiments described herein generally relate to computers. More particularly, embodiments relate to facilitating portable, reusable, and shareable Internet of Things (IoT)-based services and resources.

BACKGROUND

With the growth in IoT technology, many of the known services (e.g., home automation, factory automation, smart agriculture, etc.) are increasingly being performed using IoT devices. However, such IoT services have not yet achieved their full potential. For example, conventional IoT techniques are known for binding software applications, such as IoT applications, and consequently, user preferences, customized settings, etc., relating to an IoT application are only usable or applicable with hardcoded unique media access control (MAC) addresses and/or unique identifiers of relevant computing devices, such as those that host the software applications. Conventional techniques are unfriendly, inefficient, and lack portability and transferability, which severely limits the use and potential of IoT devices and software applications.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
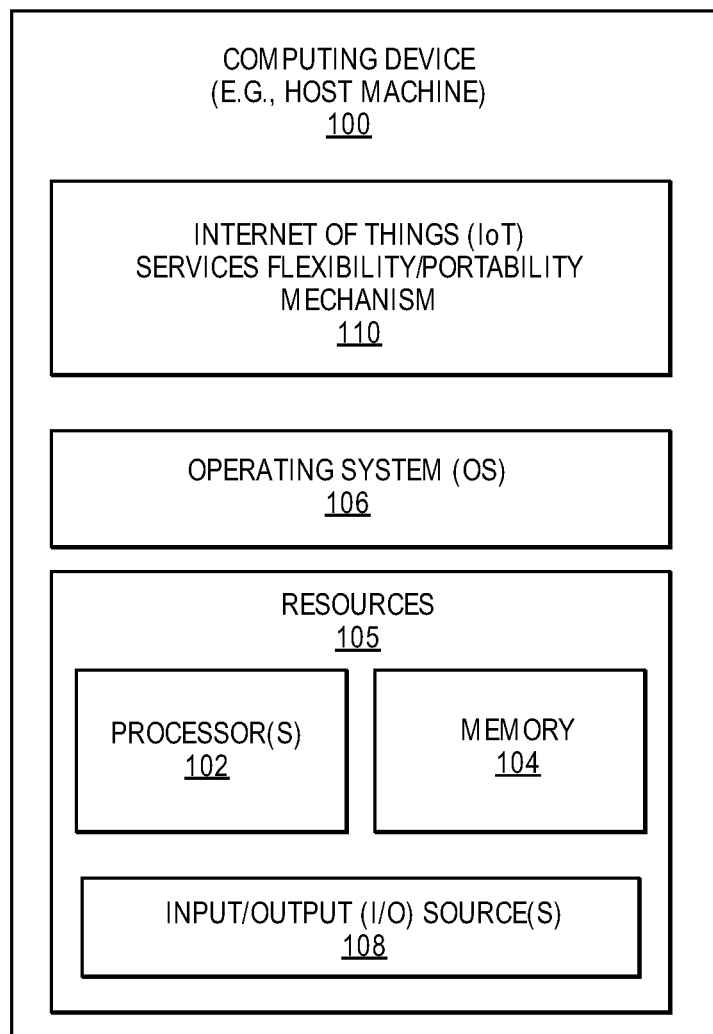
FIG. 1 illustrates a computing device employing an IoT services flexibility/portability mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for eliminating or significantly reducing human touch or involvement in management and deployment of application services (e.g., IoT services), software applications (e.g., IoT applications), and computing devices (e.g., mobile computers, IoT devices, etc.).

As aforementioned, conventional techniques tie applications, services, customized settings, etc., to hardcoded unique MAC addresses, unique identifiers, etc., of their host computing devices and thus such techniques lack portability and sharing capabilities, which is particularly problematic when the host device is lost, dead, broken, out of battery, etc., and needs to be replaced or, for example, when customized settings are to be shared with other users (e.g., family, friends, etc.) having access to a different set of computing devices, and/or the like.

For example, IoT devices have their own unique MAC addresses and/or unique device identifiers and thus, any custom settings preferred by the user for an IoT device would be tied to another computing device, such as a smartphone, that is specified in a corresponding IoT application on the IoT device. Now, for example, to replace an old smart device (e.g., smartphone) with a new one smart device, the user will need to reconfigure the IoT device settings (e.g., device identifier, MAC address, etc.) on the compatible IoT application using the new smart device, which leads to a great deal of hassle, because programs are not portable as they are tied to hardcoded device identifiers.

Embodiments provide for an easy portability and sharing of software applications, services, customized settings, etc., between varying computing devices to allow, for example: 1) frequent travelers to create a home-like environment while away from home; 2) users to carry over their customized settings for home automation from one computing device to another computing device with minimal human intervention; 3) users to share their preferred smart IoT services and their customized settings, etc., with their friends, family, etc., with minimal human intervention and without having the need to reinvent the wheel; and/or the like.

Embodiments provide for an easy and feasible technique for managing deployment of IoT devices based on resource abstraction (as opposed to hardcoded MAC address, unique identifiers, etc.) to, in turn, eliminate or at least significantly reduce human involvement or touch points during redeployment. Embodiments address and resolve the conventional challenges of lack of portability of IoT applications and their lack of scalability and resiliency. This novel technique for using resource abstraction and recipe eliminates the necessity of including a computing device's unique identification or MAC address in an IoT program. Further, a novel technique of resource orchestration provides for an effective way for easy deployment without having users to specify unique identifications of their corresponding computing devices (e.g., smartphone, tablet computer).

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to IoT applications, IoT services (e.g., IoT-based house automation), user preferences or customized settings relating to IoT services, etc., mobile computing devices (e.g., smartphones, tablet computers, etc.), Internet, Cloud network, Bluetooth, etc., but that embodiments are not limited as such.

FIG. 1 illustrates a computing device 100 employing an IoT services flexibility/portability mechanism 110 according to one embodiment. Computing device 100 serves as a host machine for hosting services flexibility and portability mechanism ("services mechanism") 110 that includes any number and type of components, as illustrated in FIG. 2, to facilitate real-time and dynamic portability and sharing of application services, such as IoT services, as will be further described throughout this document.

Computing device 100 may include any number and type of data processing devices, such as large computing systems, server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™system, etc.), e-readers, media internet devices (MIDs), media players, smart televisions, television platforms, intelligent devices, computing dust, media players, head-mounted displays (HMDs) (e.g., wearable glasses, such as Google® glass™, head-mounted binoculars, gaming displays, military headwear, etc.), and other wearable devices (e.g., smart watches, bracelets, smartcards, jewelry, clothing items, etc.), and/or the like.

Computing device 100 may include resources 105, such as an operating system (OS) 106 serving as an interface between hardware and/or physical resources of the computer device 100 and a user, one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

Figure 2A:
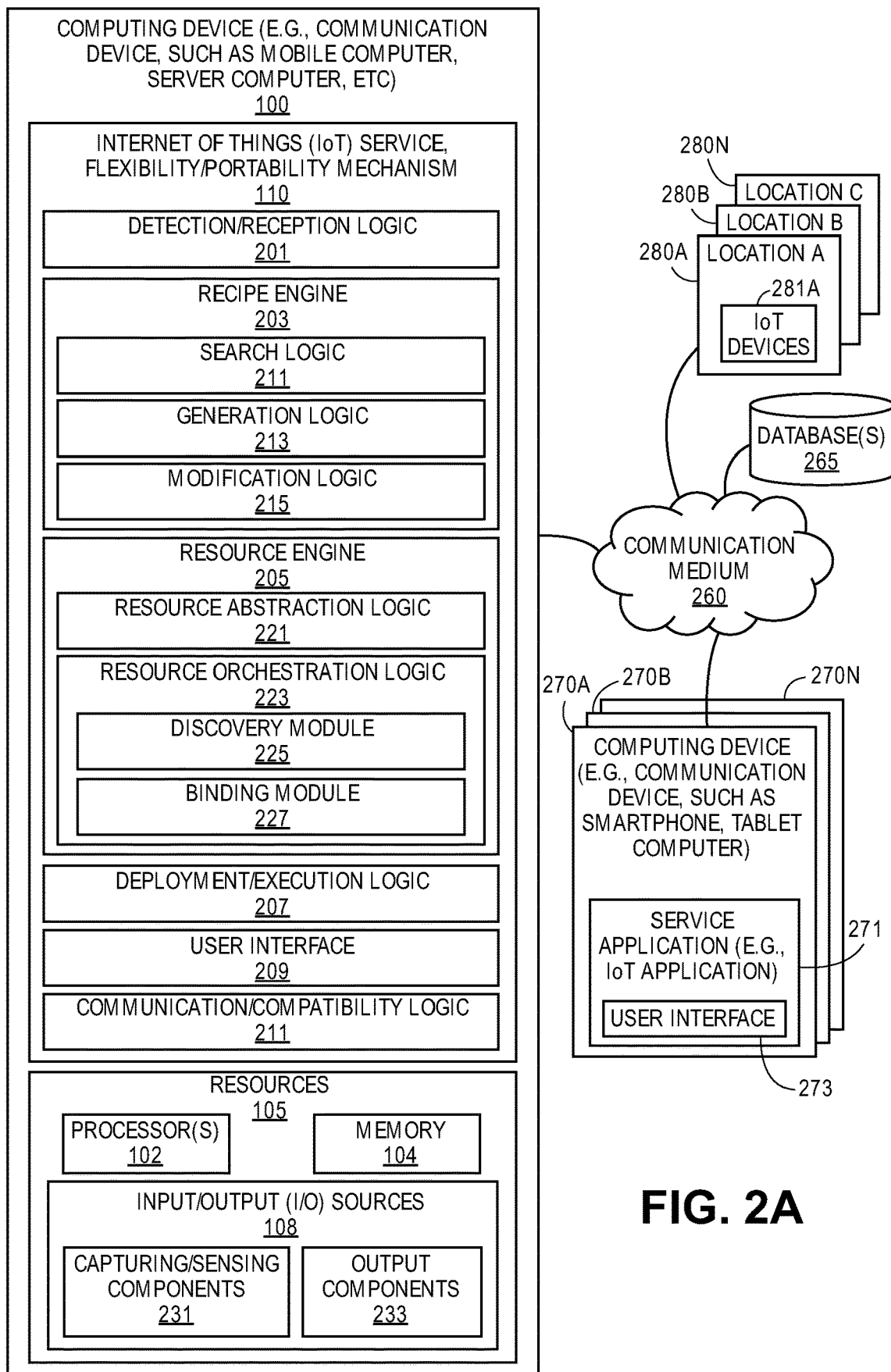
FIG. 2A illustrates an IoT services flexibility/portability mechanism according to one embodiment.

FIG. 2A illustrates an IoT services flexibility/portability mechanism 110 according to one embodiment. In one embodiment, services mechanism 110 may include any number and type of components, such as (without limitation): detection/reception logic 201; recipe engine 203 including search logic 211, generation logic 213, and modification logic 215; resource engine 205 including abstraction logic 221 and resource orchestration logic 223 including discovery module 225 and binding module 227; deployment/execution logic 207; user interface 209; and communication/compatibility logic 209. Computing device 100 further includes resources 105 including one or more of processor(s) 102, memory 104, and one or more input/output source(s) 108, etc.

In one embodiment, services mechanism 110 may be hosted by computing device 100, such as a communication device including a mobile computer (e.g., smartphone, tablet computer, etc.), wearable computer (e.g., wearable glasses, smart bracelets, smartcards, smart watches, HMDs, etc.), and/or the like. In another embodiment, computing device 100 may be a larger communication machine, such as a server computer, a desktop computer, a laptop computer, etc., that is in communication with one or more smaller computing devices 270A, 270B, 270N (e.g., mobile computer, such as a smartphone, a tablet computer, etc.) over communication medium 260, such as one or more networks (e.g., Cloud network, the Internet, proximity network, such as Bluetooth, etc.).

For example and in one embodiment, computing device 100 may serve as a server computer hosting services mechanism 110 in its entirety while communicating one or more services offered by services mechanism 110 with one or more personal devices, such as computing devices 270A-N, over communication medium 260, such as Cloud network. In another embodiment, computing device 100 may be another personal device, such as the same as one of computing devices 270A-N, where each computing device 100, 270A-N may include services mechanism 110, either partially or entirely, as part or in support of services application (e.g., IoT application) 271.

Computing device 100 may include input/out sources 108 including capturing/sensing components 231 and output components 233 which, as will be further described below, may also include any number and type of components, sensor arrays, detectors, displays, etc. For example, capturing/sensing components 231 may include (without limitation) two-dimensional (2D) cameras, three-dimensional (3D) cameras, sensors array, microphones, etc., while, output components 223 may include (without limitation) display screens, display/projection areas, projectors, speakers, etc.

As with computing device 100, each of computing devices 270A-N may include similar input/output sources, such as I/O sources 108, including (without limitation) sensors, detectors, actuators, microphones, speakers, 2D/3D cameras, touchscreens, and/or the like.

Computing devices 100, 270A-N may be further in communication with one or more repositories or data sources or databases, such as database 265, to obtain, communicate, store, and maintain any amount and type of data (e.g., recipes, resources-related information, location-related information, personal and IoT devices-related data, media, metadata, templates, real-time data, historical contents, user and/or device identification tags and other information, resources, policies, criteria, rules, regulations, upgrades, etc.).

In some embodiments, communication medium 260 may include any number and type of communication channels or networks, such as Cloud network, the Internet, intranet, Internet of Things ("IoT"), proximity network, such as Bluetooth, etc. It is contemplated that embodiments are not limited to any particular number or type of computing devices, IoT devices, IoT services or resources, databases, networks, etc.

Computing device 100 (and computing devices 270A-N) may further include I/O sources 108 having any number and type of capturing/sensing components 231 (e.g., sensor array (such as context/context-aware sensors and environmental sensors, such as camera sensors, ambient light sensors, Red Green Blue (RGB) sensors, movement sensors, etc.), depth sensing cameras, 2D cameras, 3D cameras, image sources, audio/video/signal detectors, microphones, eye/gaze-tracking systems, head-tracking systems, etc.) and output components 233 (e.g., audio/video/signal sources, display planes, display panels, display screens/devices, projectors, display/projection areas, speakers, etc.).

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 221 may further include voice recognition devices, photo recognition devices, facial and other body recognition components, voice-to-text conversion components, etc.

Computing device 100 (and similarly, computing devices 270A-N) may further include one or more output components 233 in communication with one or more capturing/sensing components 231 and one or more components of services mechanism 110. Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

As illustrated, in one embodiment, computing devices 100, 270A-N may be in communication, over communication medium 260, with one or more IoT devices, such as IoT devices 281A, at their corresponding locations, such as location 280A (e.g., house, office, factory, ballpark, restaurant, educational institution, government agency, etc.). Similarly, other locations, such as 280B-280N may include any number and type of IoT devices. It is contemplated that IoT devices 281A may include any number and type of residential and commercial devices, such as electronics (e.g., television, stereo, etc.), lighting system, washing machine, refrigerator, automobile, lawn mower, clothing items, etc. For example and in one embodiment, services application 271 (such as an IoT application) may be used to manage and control one or more of IoT devices 281A at location 280A over communication medium 260, such as proximity network, Bluetooth, Cloud network, the Internet, etc.

In one embodiment, services application 271 may include user interface 273 providing access various services of services application 271 and services mechanism 110 as will be further described in this document. In one embodiment, a user having access to personal device 270A may launch services application 271 to trigger search, creation, or modification of a recipe as facilitated by services mechanism 110. In the context of IoT, a recipe may include a list of resources that may be needed or required along with their dataflow without specifying which exact devices (e.g., smart devices) ma be used, where, in one embodiment, the recipe is portable, reusable, and sharable.

Upon triggering the recipe request (e.g., creation of a new recipe, modification of an existing recipe, searching of another recipe, etc.) via user interface 273 which may be the same as user interface 209, the recipe request may be received at detection/reception logic 201 at services mechanism 110 at computing device 100. The recipe request may then be provided on to recipe engine 203 for further processing.

In one embodiment, a user may choose to create a new recipe in which case, the user may specify one or more resource requirements (e.g., light sensor, threshold, computing devices, etc.) and business logic to implement the one or more resource requirements. For example, the user may choose to create a new recipe using user interface 273 as further facilitated by generation logic 213 of recipe engine 203 at services mechanism 110.

In another embodiment, the user may search for and download a recipe over communication medium 265 (e.g., Cloud network, the Internet) from one or more repositories, such as database(s) 265, etc., by placing a search through user interface 273 and as facilitated by search logic 211 of services mechanism 110. In some embodiments, the searched/downloaded recipe may be deployed and used as its downloaded format or modified in any number of ways as facilitated by modification logic 215 of services mechanism 110, such as by modifying one or more of resource requirements associated with the recipe, which may then be used to alter the business logic associated with the recipe.

Embodiments are not limited to any particular implementation, such as any number and type of IoT device-based implementations (e.g., house automation, office automation, factory automation, smart automation, etc.); however, for the sake of brevity, clarity, and ease of understanding, house automation, including household IoT devices, is discussed throughout this document, as illustrated with reference to FIG. 2B.

For example and in one embodiment, a recipe may include one or more resource requirements (e.g., input, output, etc.) and one or more elements of business logic (e.g., functions, if/then, etc.) for achieving resource orchestration to facilitate automation and/or control household various electronic items or systems, such as lighting, sockets, air-conditioning, washing machine and dryer, television, media players, security system, etc. As aforementioned, in one embodiment, recipes are portable such that they can be sent, posted, and/or shared with other users (e.g., friends, family, neighbors, associates, etc.) via one or more peer-to-peer communication applications, such as email, short message service (SMS), social networking website, Cloud service, etc., over one or more communication channels or networks, such as communication medium 260.

In one embodiment, in case of an IoT-based smart lighting system control for a house, a recipe may include one or more of the following resource requirements: 1) input =light sensor, threshold (lamination limit of 1000); 2) output: power strip; and 3) function=less than; similarly, one or more elements of business logic may include: 1) if a light sensor is less than 1000 (threshold), then set the power strip ON; and 2) if a light sensor is NOT less than 1000 (threshold), then set the power strip OFF.

For example, a Cloud service may be used as an optional component for recipes sharing, where the Cloud service may be used to provide communication between computing devices 100, 270A-N, IoT devices 281A, database(s) 265, etc., to allow for discovering and sharing of recipes which, in turn, may be deployed on one or more of computing devices 100, 270A-N as facilitated by deployment/execution logic 207. In one embodiment, a deployed recipe may then be used along with an IoT application, such as services application 271, that may then be used for managing and/or controlling various household IoT devices, such as IoT devices 281A.

It is contemplated that a user may be an individual or a group of individuals having access to one or more computing devices 100, 270A-N including any number and type of computing devices, such as mobile computers having one or more of smartphones, tablet computers, smart wearable device, etc., having input/output resources, such as I/O resources 108. Similarly, IoT devices 281A and their corresponding location, such as location 280A, may include a smart device (e.g., household items, office equipment, clothing items, etc.) that is an interconnected computing device embedded with input elements (e.g., 2D/3D cameras, sensors, actuators, etc.), output elements (e.g., display screen, touchscreen, etc.), communication elements, etc. For example, IoT devices 281A may be compatible with any number and type of communication protocols, such as ZigBee, Bluetooth, Wi-Fi, etc., and programmable on their own or through an optional gateway process. For example, a gateway process may be used to act as a broker between, for example, one or more IoT devices 281A and one or more computing devices 100, 270A-N, etc.

Referring back to recipes, once a recipe request is processed at recipe engine 203, any resulting data is forwarded on to resource engine 205 for further processing. In one embodiment, resource abstraction logic 221 may be used to provide a taxonomy framework abstracting various resources away from IoT devices, such as IoT device 281A, which include (without limitation) sensing, actuating, computing, storing, etc. This may be realized by various connectivity frameworks, such as Open Interconnect Consortium (OIC), IoTivity, AllSeen, etc. In one embodiment, resource abstraction logic 221 allows for managing deployment of IoT devices, such as IoT devices 281A, without or with minimal human involvement or manipulation. For example, with resource abstraction logic 221, resources may be treated indifferently as long as they fall within a category in the taxonomy, such as occupancy sensing, etc., making services application 271 (e.g., IoT application) portable, reusable, and sharable, as facilitated by services mechanism 110, so they can be written and stored in a way that specifies resources requirements without their specific identity information (e.g., MAC address).

In one embodiment, upon receiving resulting data from recipe engine 203, resource engine 205 is triggered where resource abstraction logic 221 review the selected or preferred recipe and accordingly, modifies one or more resource requirements. Further, resource abstraction logic 221 determines whether the resources specified in the one or more resource requirements are identified and ready for deployment. This information may then be forwarded on to discovery module 225 of resource orchestration logic 223 to discover or search for the relevant resources identified in the one or more resource requirements. Any information regarding the resources that are found and/or not found is then provided to binding module 227.

In one embodiment, binding module 227 then sets the relevant resources into an order list and confirms whether all relevant resources have been found. If not all relevant resource have been found, binding module 227 may communicate back with discovery module 225 to continue searching for the unfound/undiscovered relevant resources. If, however, all relevant resources have been found, the discovered relevant recourses are applied to the business logic of the selected/preferred recipe in accordance with the one or more resource requirements, where recipe (including business logic and the one or more resource requirements) is deployed to be used for controlling and managing IoT devices 281A as facilitated by deployment/execution logic 207. In one embodiment, once deployment and execution of the recipe is performed by deployment/execution logic 207, the relevant IoT services may be performed using any number and type of resources. It is further contemplated that any number and type of IoT services and resources-related components and tasks may be accessed and performed, respectively, using user interface 209 at computing device, user interface 273 at computing device 270A, etc.

It is contemplated that a resource may range from any small component, such as a light switch, to a communication protocol/network, such as Wi-Fi, Bluetooth, to another IoT device, such as IoT devices 281A, to another personal device, such as computing device 100, 270A-N, serving as a replacement device, an additional device, a backup device, etc., and/or the like.

This novel technique of using recipes based on resource abstraction eliminates the necessity for including devices/resources (e.g., IoT devices 281A, computing devices 100, 270A-N, etc.) unique identifications in IoT applications (e.g., services application 271), wherein resource orchestration further provides for an effective and efficient manner for defining and deploying any number of devices/resources for fulfilling requirements as specified and set forth in the recipes to be used for deployment. In one embodiment, using services mechanism 110, a user may choose to employ their own personalized home-like IoT devices 281A management environment at anytime and using any of computing devices 100, 270A-N to be able to share and communication one or more recipes via services application 271, where communication may be performed using any number and type of communication applications, such as email, text, etc., over any communication medium 260, such as Bluetooth, Cloud network, Wi-Fi, the Internet, etc.

Communication/compatibility logic 211 may be used to facilitate dynamic communication and compatibility between computing devices 100, 270A-N, IoT devices 281A, database(s) 265, communication medium 260, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of computing device 100. In yet another embodiment, "logic" may refer to or include a firmware component that is capable of being part of system firmware, such as firmware of an application processor or a graphics processor, etc., of computing devices 100.

Further, any use of a particular brand, word, term, phrase, name, and/or acronym, such as "Internet of Things", "IoT", "recipe", "resource abstraction", "resource orchestration", "resource binding", "IoT device", "personal device", "location", "smart device", "mobile computer", "wearable device", etc., should not be read to limit embodiments to software or devices that carry that label in products or in literature external to this document.

It is contemplated that any number and type of components may be added to and/or removed from services mechanism 110 to facilitate various embodiments including adding, removing, and/or enhancing certain features. For brevity, clarity, and ease of understanding of services mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
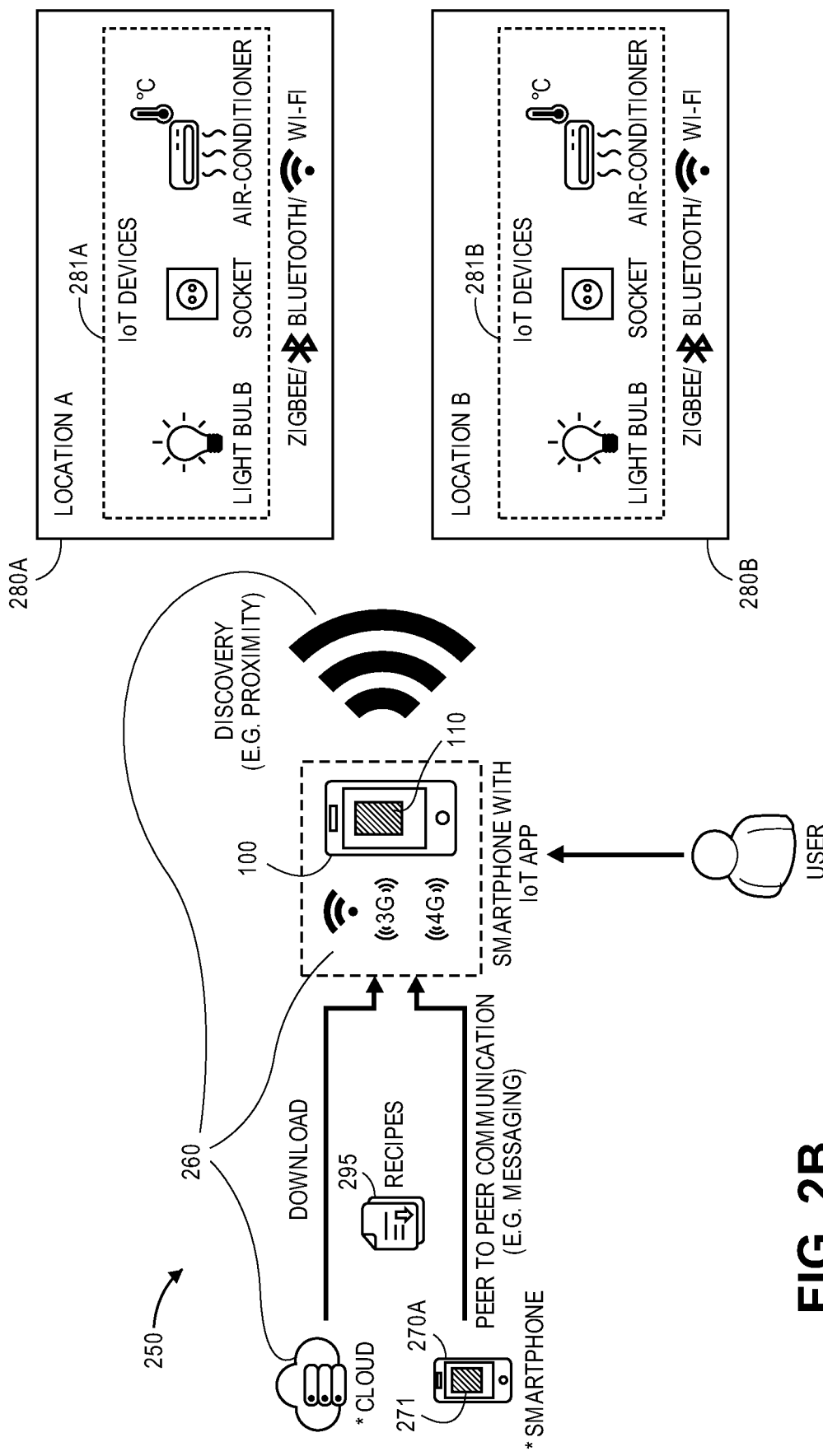
FIG. 2B illustrates an architectural placement according to one embodiment.

FIG. 2B illustrates an architectural placement 250 according to one embodiment. As an initial matter, for brevity, clarity, and ease of understanding, many of the components and processes discussed above with reference to FIGS. 1-2A may not be repeated or discussed hereafter. It is contemplated and to be noted that embodiments are not limited to any particular use case scenario, architectural setup, transaction sequence, etc., and that any number and type of components may be employed, placed, and used in any manner or form to perform the relevant tasks.

In the illustrated embodiment, computing device 100 employing services mechanism 110 may be in communication with computing device 270A and IoT devices 281A, 281B over communication medium 260. For example and in one embodiment, as described with reference to FIG. 2A, recipes 295 may be obtained from one or more databases, computing devices, etc., over communication medium 260, such as a Cloud network, 3G/4G networks, etc., and further, as facilitated by services mechanism 110, one or more recipes 295 may be modified (e.g., modifying a resource requirement and/or business logic of a recipe), deployed, and shared between computing devices 100 and 270A to be used for managing and controlling one or more IoT device 281A and 281B at locations 280A and 280B, respective.

Figure 3:
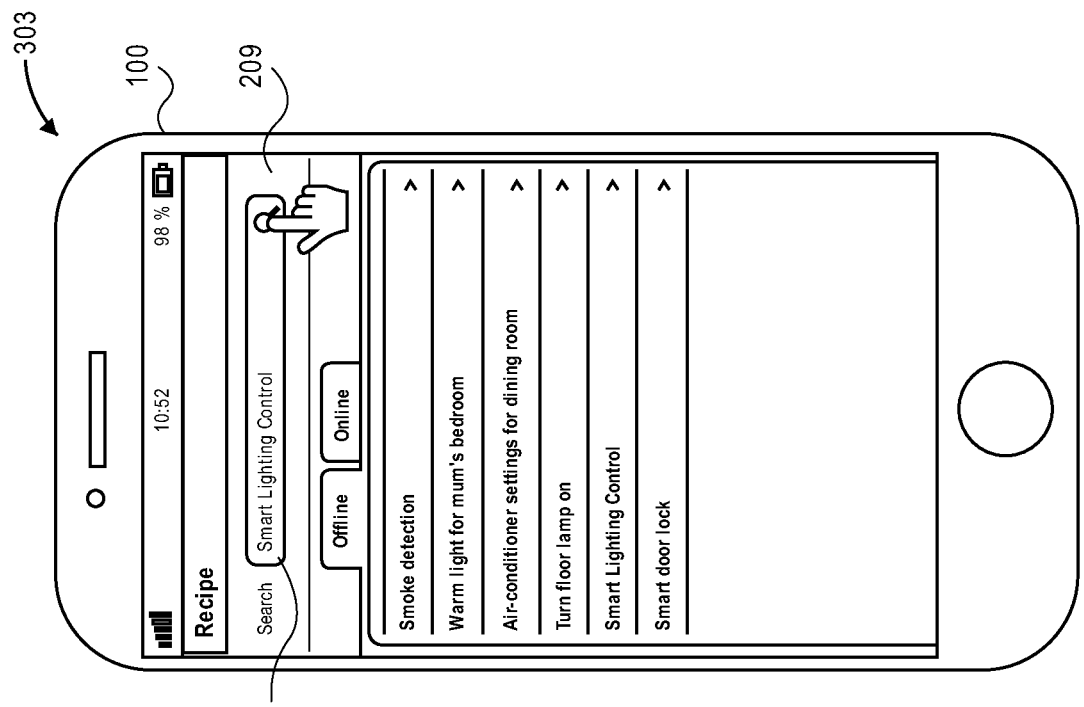
FIG. 3 illustrates a transaction sequence according to one embodiment.
Figure 3:
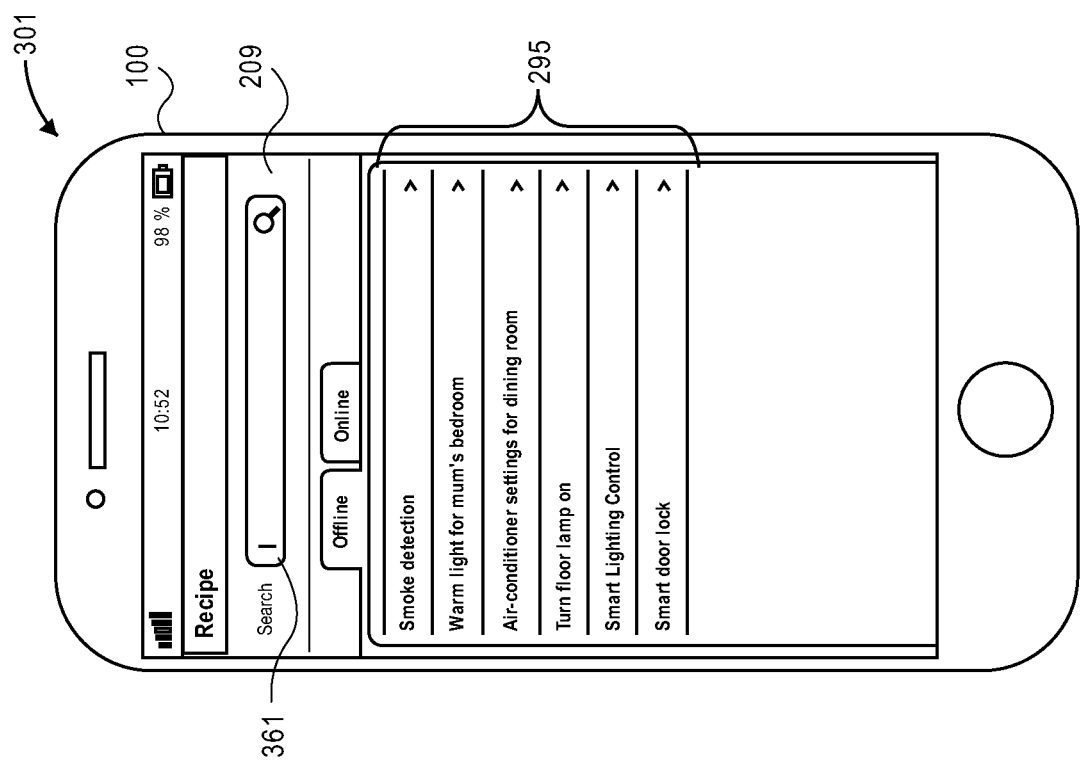
Figure 3:
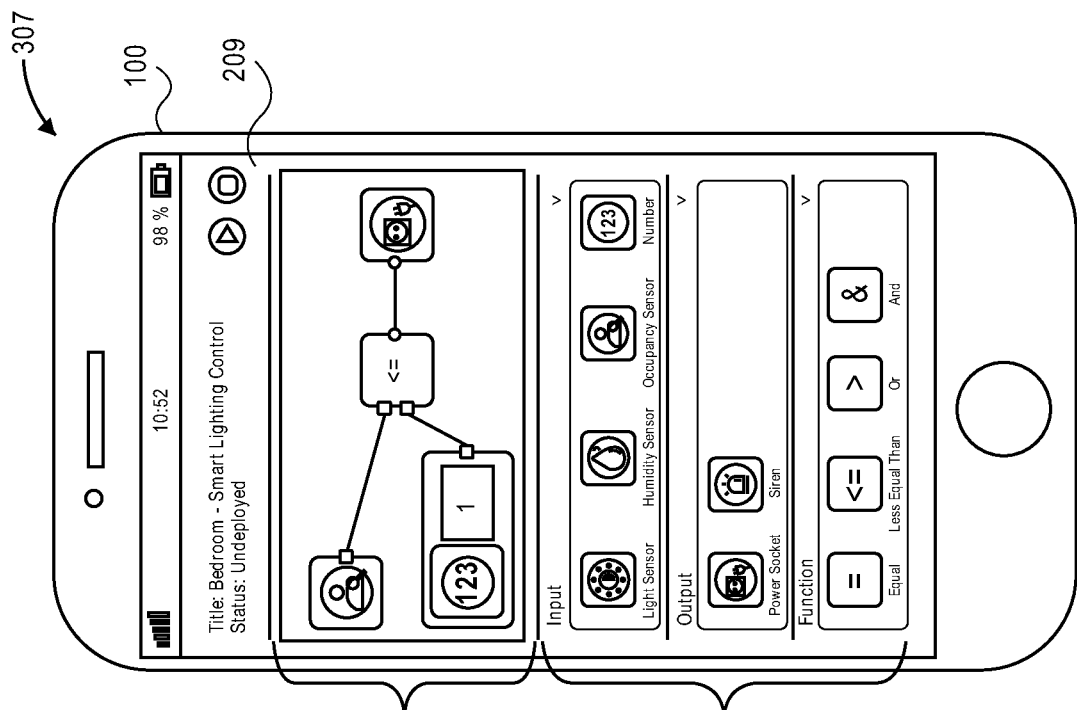
Figure 3:
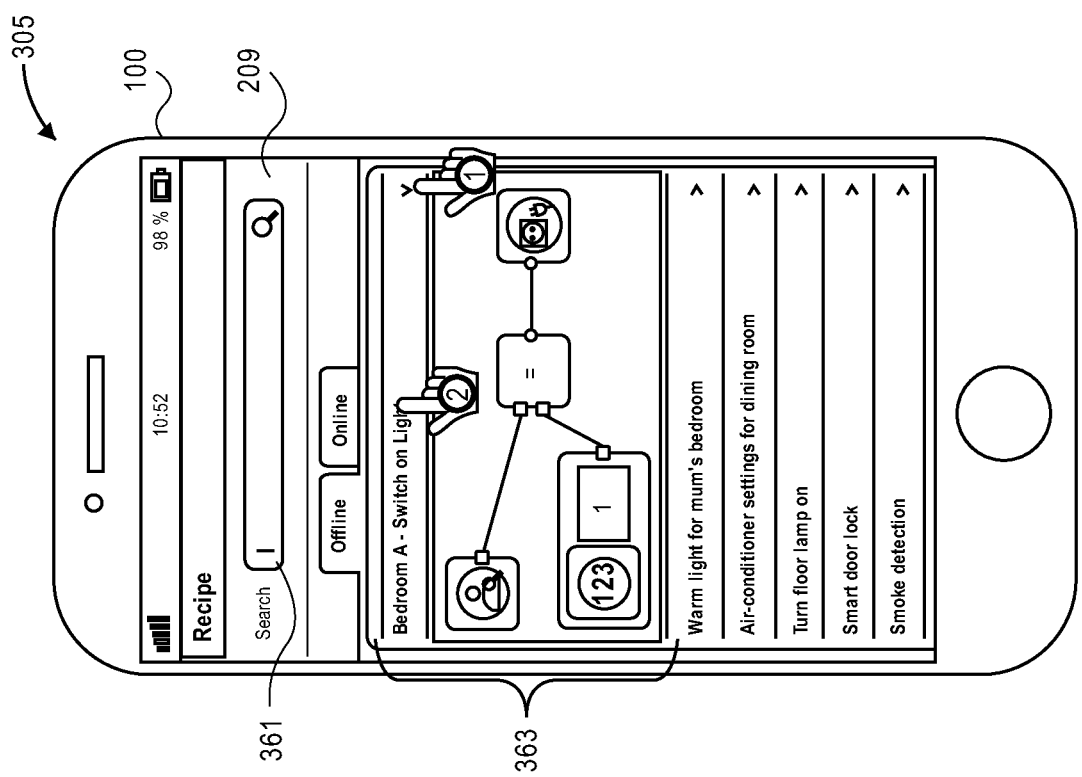
Figure 3:
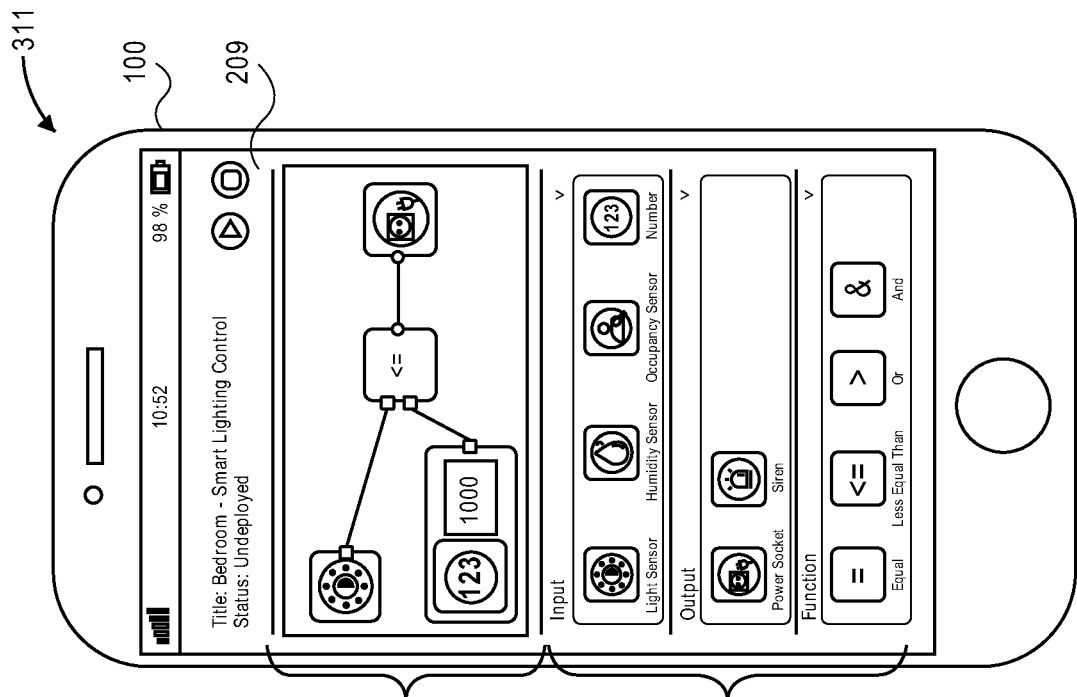
Figure 3:
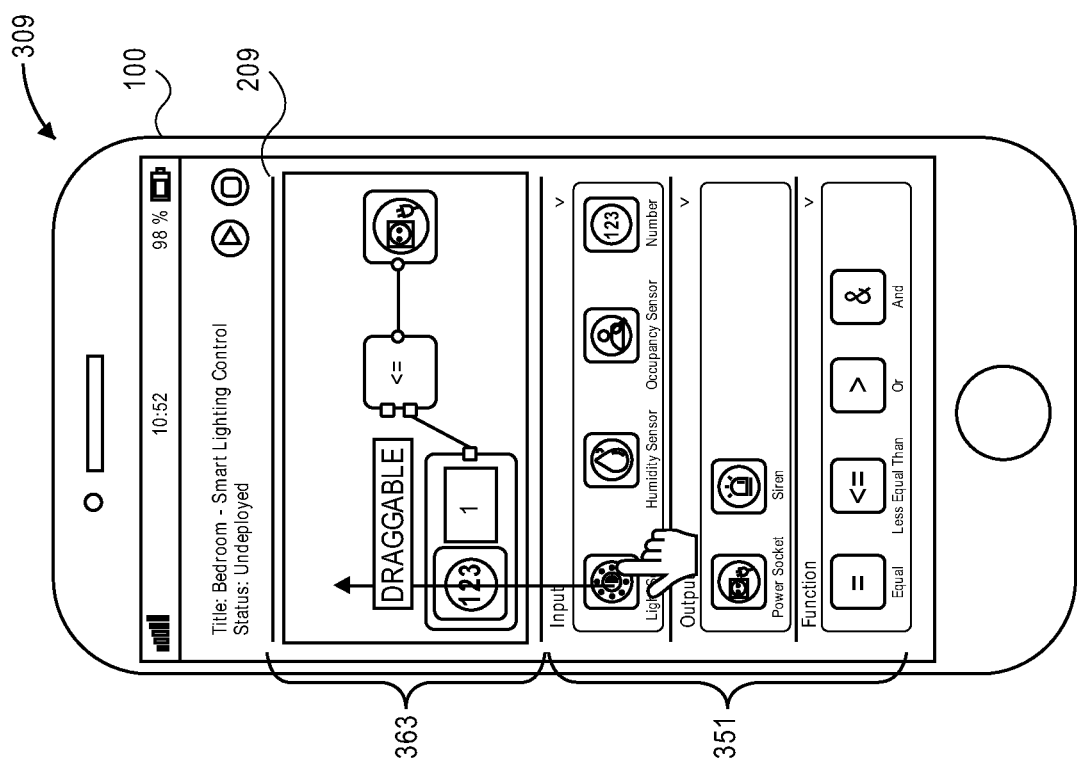
Figure 3:
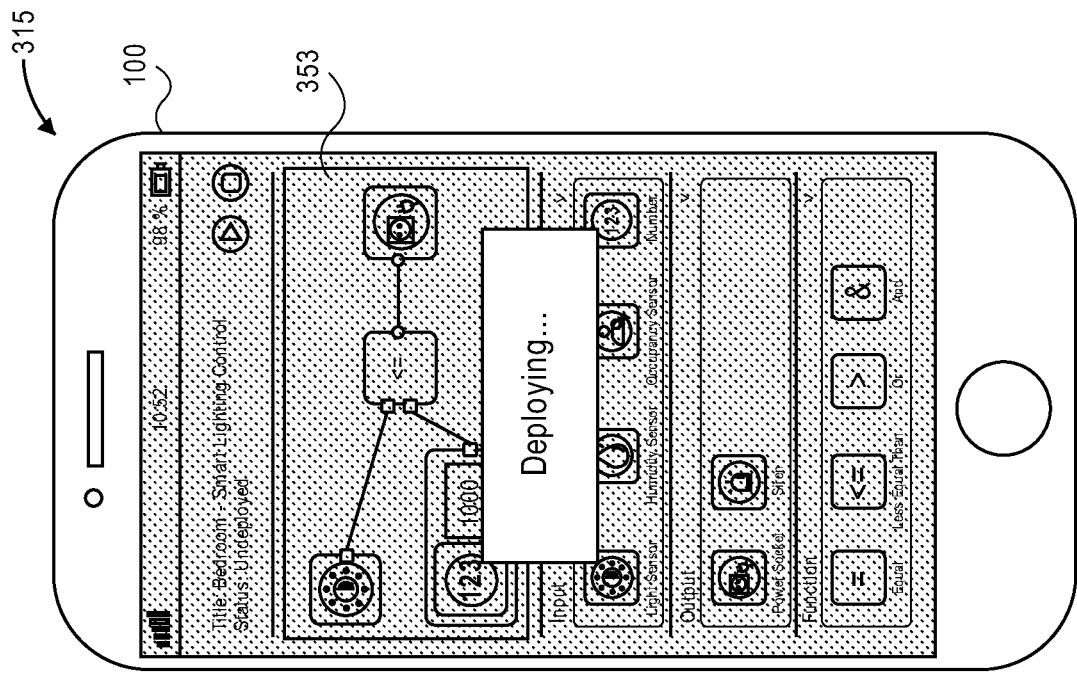
Figure 3:
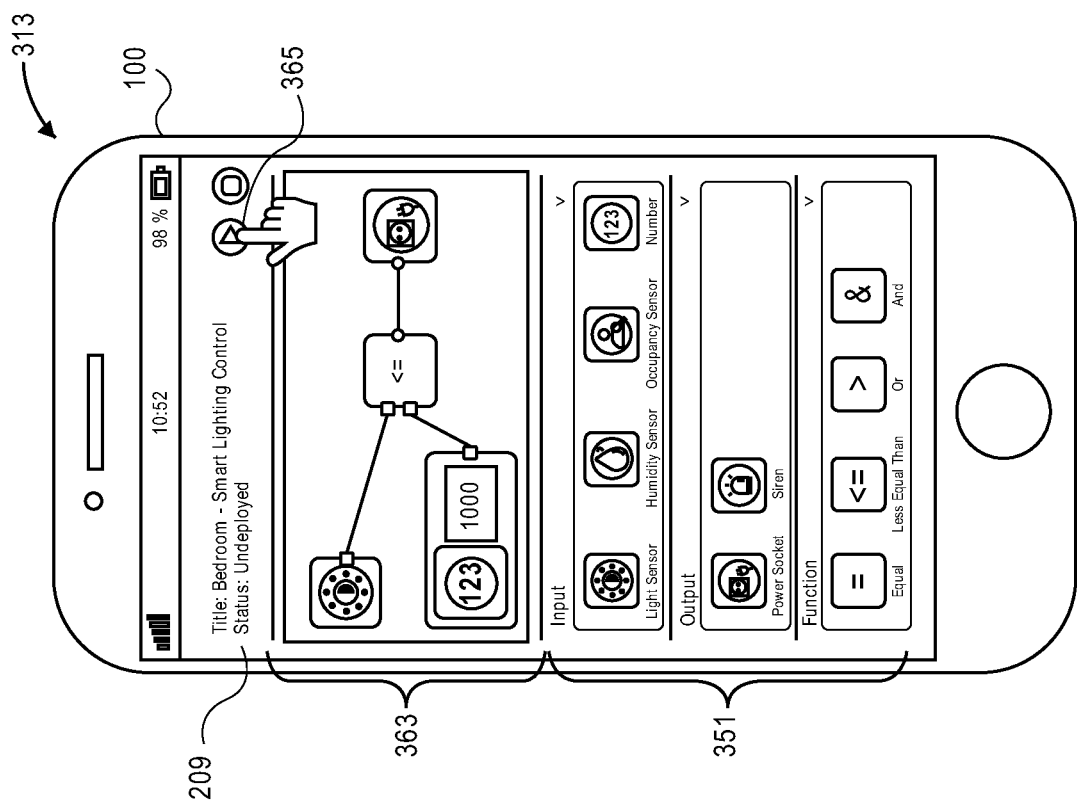
Figure 3:
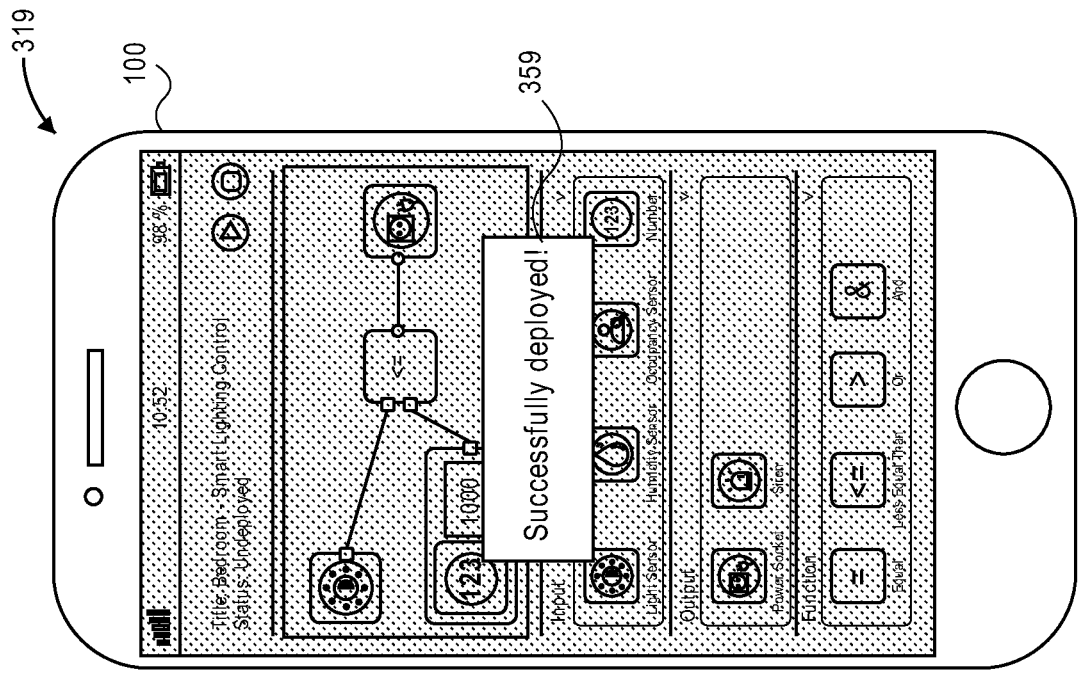
Figure 3:
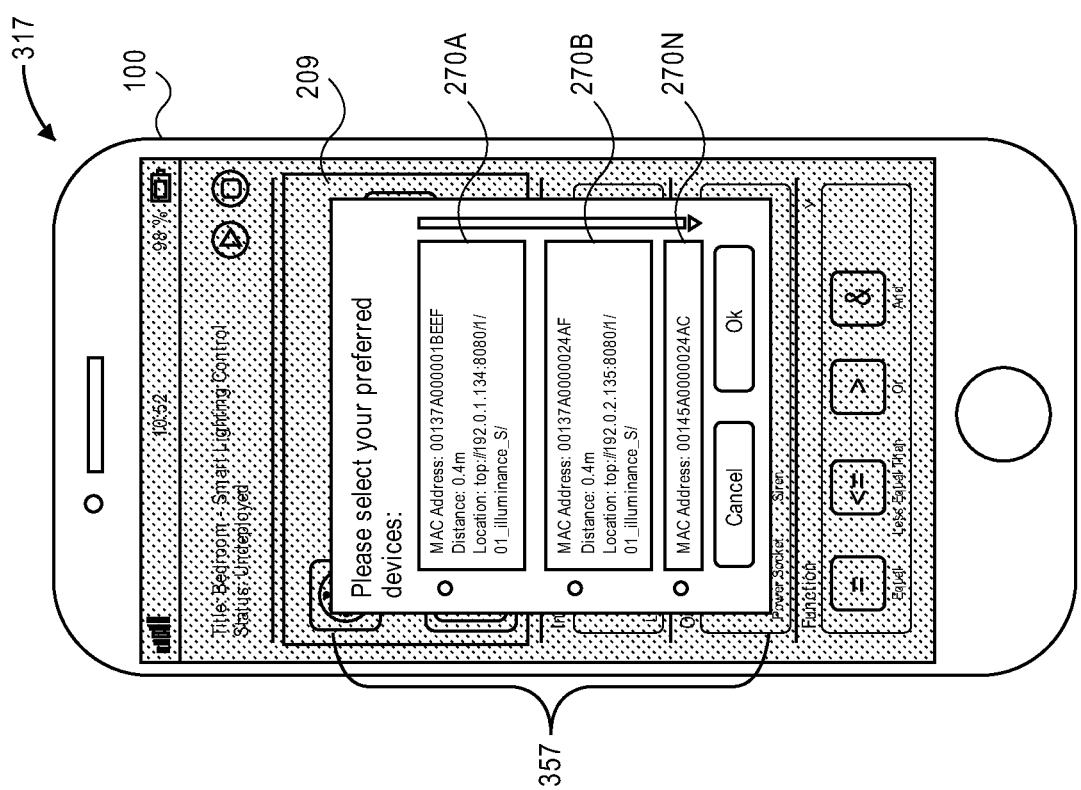
Figure 3:
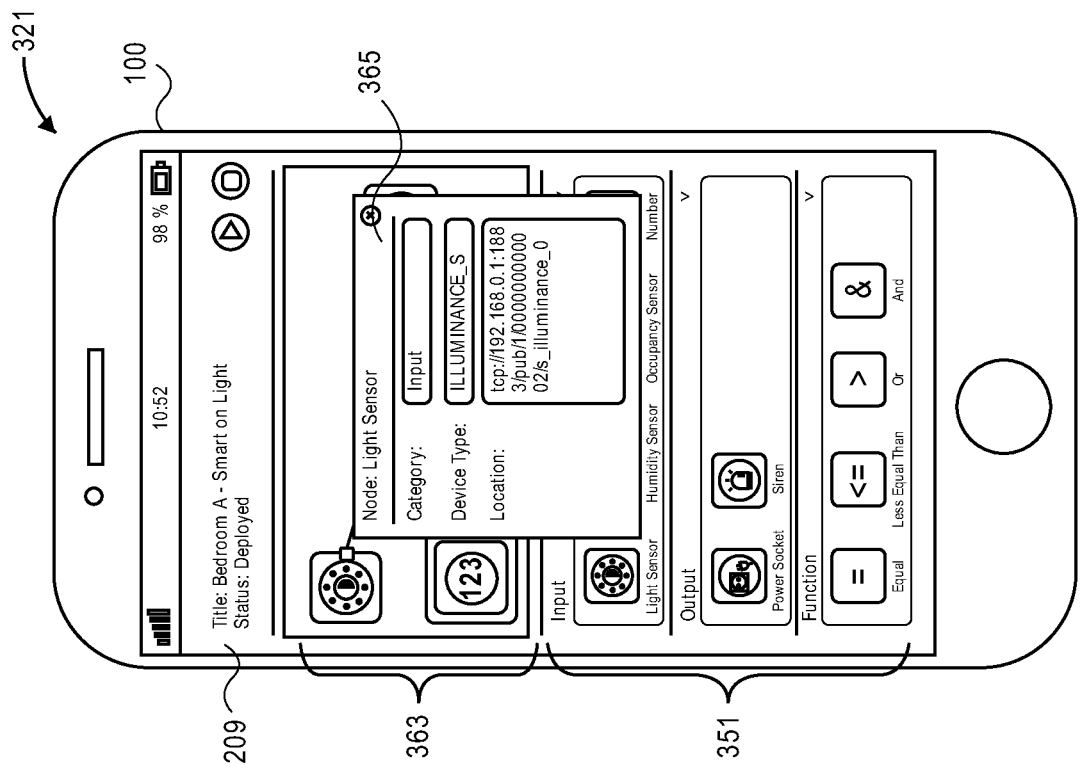

FIG. 3 illustrates a transaction sequence having processes 301-321 according to one embodiment. Transaction sequence including processes 301-321 may be performed by processing logic that may comprise hardware (e.g., circuitry, dedicated logic, programmable logic, etc.), software (such as instructions run on a processing device), or a combination thereof, as facilitated by services mechanism 110 and/or services application 271 of FIG. 2A. Further, processes 301-321 of transaction sequence are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Transaction sequence beings at process 301 with computing 100 (e.g., mobile computer, such as a smartphone, table computer, etc.) hosting and launching services mechanism 110 and/or an IoT application, such as services application 271A of FIG. 2A. As illustrated, user interface 209 shows a number of offline recipes 295 (e.g., smoke detection, warm light for men's bedroom, smart door lock, etc.) that the user of computing device 100 may have created, where user interface 209 further provides a search option, such as search 361, for searching additional recipes, such as over a Cloud network. As illustrated, at process 303, the user may choose to search for another recipe, such as smart lighting control, using search 361 and applying a single tap on the preferred recipe in order to navigate to the deployment stage of the recipe.

At process 305, as illustrated, the user may choose to modify business logic 363 of a recipe (e.g., bedroom A—switch on light) based on their personal preferences, such as, as illustrated with respect to process 307, the user may select one or more resource requirements 351 (e.g., input, output, function, etc.) to modify business logic 363.

The selected input, output, and function as provided through user interface 209 may be defined based on their category in taxonomy and subsequently, a set of resources requirement 351 for business logic 263 may be generated prior to deployment. For example, as discussed with reference to FIG. 2A, with the use of resource abstraction logic 221 of services mechanism 110, users may no longer need to specify any device identity information (e.g., MAC address) for any deployment at IoT applications, such as one or more of computing devices 270A-N.

At process 309, business logic 363 is modified using one or more resource requirements 351, such as by substituting "occupancy sensor" of threshold of "1 (person)" with "light sensor" of threshold of "1000 (illuminations)" to finalize the recipe including business logic 363 and resource requirements 351. At process 311, the modification of business logic 363 is completed and the recipe is finalized.

At process 313, using user interface 209, the user may tap on deployment button 365 to initiate deployment of the modified recipe based on business logic 363 and subsequently, at process 315, deployment is shown in progress 353. Once deployment button 365 is tapped, resource orchestration logic 223, as discussed with reference to FIG. 2A, may be triggered by accepting the recipe as an input, searching for the available relevant resources, and deploying them onto corresponding devices, such as one or more of computing device 100, 207A-N. The search may be based on criteria provided by the user and, using services mechanism 110 of FIG. 2A, an order list of relevant resources, such as based on priority levels, may be generated, wherein the criteria includes (without limitation) ownership of resources, proximity of resources, such as same room, same floor, same building, etc. For example, resource orchestration logic 223, in the background, may search for any available relevant resources that may then be used in deploying business logic 363.

At process 317, relevant resources 357, such as other available personal computing devices 270A, 270B, 270N, other devices/resources, such as IoT devices or their components, etc., are listed in order list 357, where the one device, such as computing device 270A, that meets or is closest to meeting the criteria, such as proximity, is listed on top of order list 357 and specified by resource orchestration logic 223 as the resource for deployment. For example, in some embodiment, there may be more then one resources found, as listed here in order list 357, and thus any binding, as facilitated by binding module 227 of FIG. 2A, may be one to many. Further, for example, a prompt dialog that contains a set of metadata (e.g., MAC address, distance, location, etc.) may be shown to assist the user in selecting their preferred resource from order list 357.

Once the user has selected a resource from order list 357, a deployment mapping may be triggered and subsequently, the deployment is successfully completed 359 at process 319, where the user may click on a device/resource icon to view any relevant information 365 relating to each device/resource as shown with regard to process 321 of the transaction sequence. It is contemplated that a device/resource may include one or more computing devices 270A-N, any number and type of other devices or resources, such as IoT devices (e.g., lighting system, washing machine, television, etc.), and/or one or more components of IoT devices (e.g., switch, bulb, fuse, street light, etc.), and/or the like. For example, as shown in process 321, the selected resource and any other resources may perform one or more actions relating to business logic 363 if the event is triggered based on one or more resource requirements 351. For example, any of the following triggering techniques may be used: 1) in one embodiment, if personal device 100 is not programmable, a gateway process may be may be used to handle the triggering process, such as off-the-shelf home automation sensors, etc.; and 2) if personal device 100 is programmable, personal device 100 may itself perform business logic 363, such as Intel®-based sensor boards.

Figure 4:
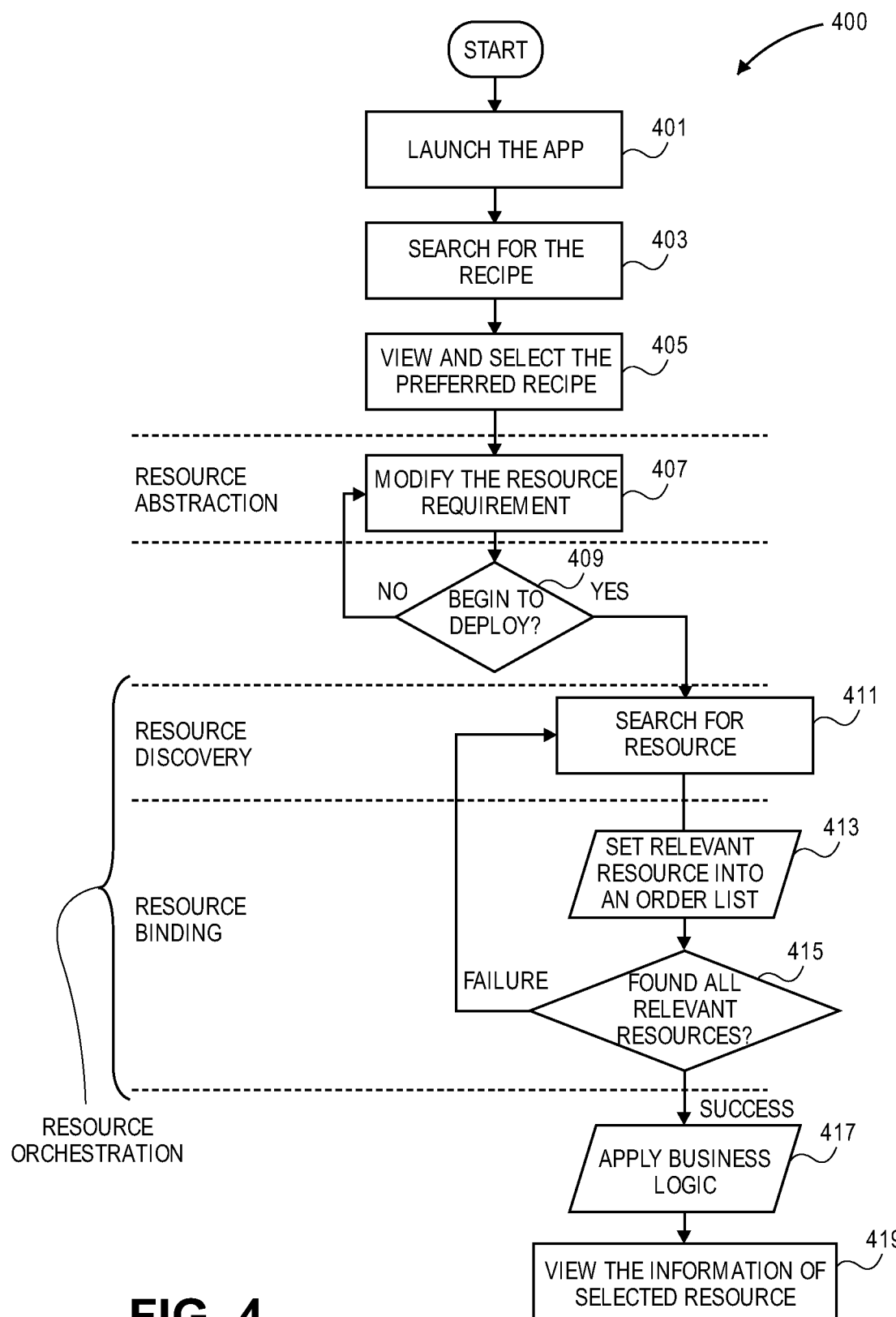
FIG. 4 illustrates a method for facilitating portable, reusable, and shareable IoT services and resources according to one embodiment.

FIG. 4 illustrates a method 400 for facilitating portable, reusable, and shareable IoT services and resources according to one embodiment. Method 400 may be performed by processing logic that may comprise hardware (e.g., circuitry, dedicated logic, programmable logic, etc.), software (such as instructions run on a processing device), or a combination thereof, as facilitated by services mechanism 110 and/or services application 271 of FIG. 2A. The processes of method 400 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 400 begins at block 401 with launching of a services application (e.g., IoT application) at a computing device. At block 403, in one embodiment, search for a recipe is initiated and, at block 405, a preferred recipe is searched, viewed, and selected from one or more recipes. At block 407, in one embodiment, a resource abstraction stage is triggered with modification of one or more resource requirements associated with the recipe.

At block 409, a determination is made as to whether deployment ought to begin. If not, the process continues with further modification of the one or more resources at block 407. If yes, in one embodiment, a discovery stage of a resource orchestration stage is triggered at block 411 with searching of relevant resources, where the relevant resources relate to the modified resources requirement.

At block 413, in one embodiment, a binding stage of the resource orchestration stage is triggered with placing of relevant resource into an order list. At block 415, a determination is made as to whether all relevant resources are found. If not, the process is considered a failure and continues further search at block 411. If yes, the process is considered a success and the process continues with deployment and application of business logic of the recipe based on the modified resource requirements at block 417. At block 419, any information about a relevant resource may be requested and viewed by the user.

Figure 5:
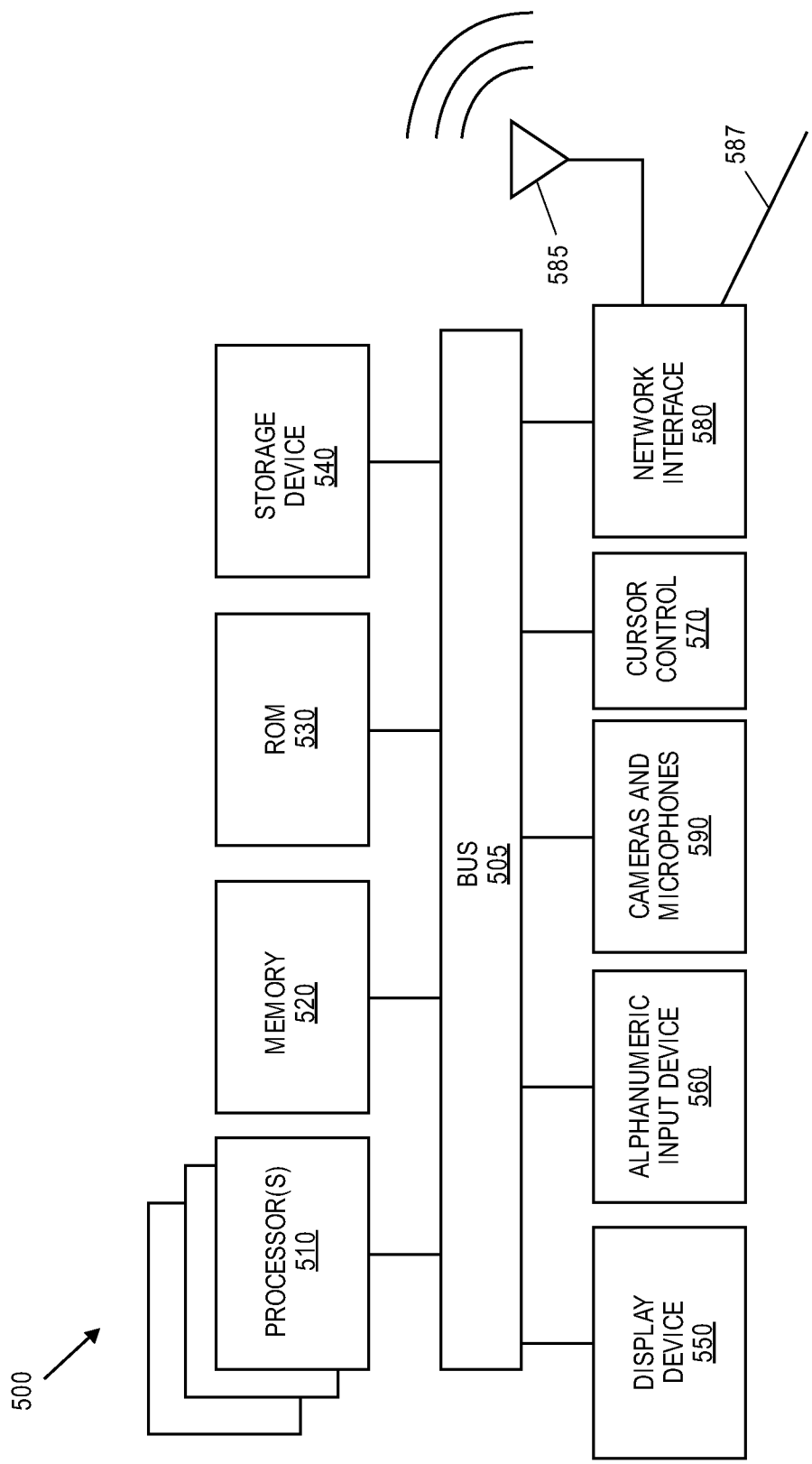
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more transitory or non-transitory machine-readable storage media having stored thereon machine-executable instructions that, when executed by one or more machines such as a processing device, a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
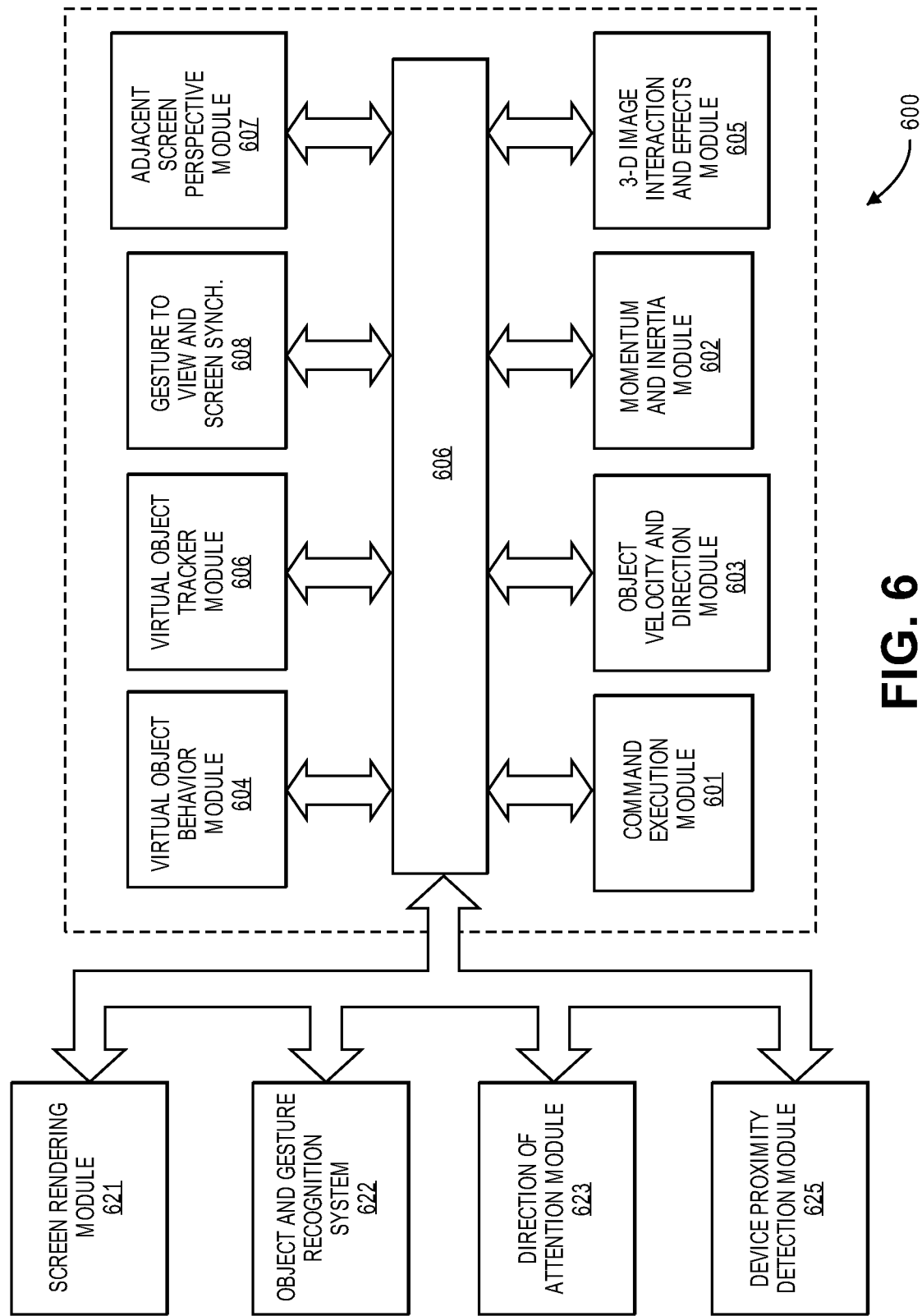
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three dimensional space in a vicinity of an display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate portable, reusable, and shareable Internet of Things-based services and resources, comprising: detection/reception logic to receive a recipe request for selecting a recipe relating to Internet of Things (IoT) services, wherein selecting includes at least one of searching the recipe and modifying the recipe; recipe engine to select the recipe, wherein the recipe includes a set of resource requirements and business logic; resource abstraction logic of resource engine to modify the set of resource requirements, wherein the modified set of resource requirements is associated with the business logic to modify the recipe; and deployment/execution logic to deploy the modified recipe at one or more computing devices, wherein the modified recipe to facilitate management for one or more IoT devices at one or more locations.

Example 2 includes the subject matter of Example 1, wherein recipe engine further comprises: search logic to search the recipe or generation logic to generate the recipe, wherein the recipe is searched over a network including at least one of a cloud network, a proximity network, and the Internet; and modification logic to facilitate modification of the recipe, wherein modifying includes revising the set of resource requirements of the recipe, wherein revising includes at least one of adding one or more new resources to the set of resource requirements and removing or switching one or more existing resources of the set of resource requirements.

Example 3 includes the subject matter of Example 1, wherein the resource engine further comprises resource orchestration logic including discovery module to discover one or more relevant resources based on the modified set of resource requirements.

Example 4 includes the subject matter of Example 1 or 3, wherein the resource orchestration logic further comprises binding module to generate an order list of the one or more relevant resources, wherein the order list is generated based on criteria including at least one of proximity of the one or more relevant resources from each other or with the one or more IoT devices, one or more locations of the one or more relevant resources, one or more types of the one or more relevant resources, and one or more networks connecting the one or more relevant resources.

Example 5 includes the subject matter of Example 4, wherein the binding logic is further to prepare the business logic for deployment by facilitating the discovery module to reiterate a discovery process until the one or more relevant resources are discovered, wherein the modified recipe is deployed when the business logic is prepared for deployment.

Example 6 includes the subject matter of Example 1, wherein the one or more relevant resources comprise at least one of the one or more computing devices, the one or more IoT devices, one or more components of the one or more IoT devices, the one or more networks, and one or more communication protocols.

Example 7 includes the subject matter of Example 1, wherein the set of resource requirements comprises at least one of an input requirement, an output requirement, and a function requirement.

Example 8 includes the subject matter of Example 7, wherein the input requirement defines a first component of an IoT device, wherein the second requirement defines a second component of the IoT device, and the function requirement defines a relationship between first component and the second component.

Example 9 includes the subject matter of Example 1 or 7, wherein the business logic to facilitate implementation of the recipe based on at least one of the input, output, and function requirements of the set of resource requirements.

Some embodiments pertain to Example 10 that includes a method for facilitating portable, reusable, and shareable Internet of Things-based services and resources, comprising: receiving a recipe request for selecting a recipe relating to Internet of Things (IoT) services, wherein selecting includes at least one of searching the recipe and modifying the recipe; selecting the recipe, wherein the recipe includes a set of resource requirements and business logic; modifying the set of resource requirements, wherein the modified set of resource requirements is associated with the business logic to modify the recipe; and deploying the modified recipe at one or more computing devices, wherein the modified recipe to facilitate management for one or more IoT devices at one or more locations.

Example 11 includes the subject matter of Example 10, wherein selecting further comprises: searching or generating the recipe, wherein the recipe is searched over a network including at least one of a cloud network, a proximity network, and the Internet; and modifying the recipe, wherein modifying includes revising the set of resource requirements of the recipe, wherein revising includes at least one of adding one or more new resources to the set of resource requirements and removing or switching one or more existing resources of the set of resource requirements.

Example 12 includes the subject matter of Example 10, further comprising discovering one or more relevant resources based on the modified set of resource requirements.

Example 13 includes the subject matter of Example 10 or 12, further comprising generating an order list of the one or more relevant resources, wherein the order list is generated based on criteria including at least one of proximity of the one or more relevant resources from each other or with the one or more IoT devices, one or more locations of the one or more relevant resources, one or more types of the one or more relevant resources, and one or more networks connecting the one or more relevant resources.

Example 14 includes the subject matter of Example 13, further comprising preparing the business logic for deployment by facilitating the discovery module to reiterate a discovery process until the one or more relevant resources are discovered, wherein the modified recipe is deployed when the business logic is prepared for deployment.

Example 15 includes the subject matter of Example 10, wherein the one or more relevant resources comprise at least one of the one or more computing devices, the one or more IoT devices, one or more components of the one or more IoT devices, the one or more networks, and one or more communication protocols.

Example 16 includes the subject matter of Example 10, wherein the set of resource requirements comprises at least one of an input requirement, an output requirement, and a function requirement.

Example 17 includes the subject matter of Example 16, wherein the input requirement defines a first component of an IoT device, wherein the second requirement defines a second component of the IoT device, and the function requirement defines a relationship between first component and the second component.

Example 18 includes the subject matter of Example 10 or 16, further comprising facilitating implementation of the recipe based on at least one of the input, output, and function requirements of the set of resource requirements.

Some embodiments pertain to Example 19 includes a system comprising a storage device having instructions, and a processor to execute the instructions to facilitate a mechanism to: receive a recipe request for selecting a recipe relating to Internet of Things (IoT) services, wherein selecting includes at least one of searching the recipe and modifying the recipe; select the recipe, wherein the recipe includes a set of resource requirements and business logic; modify the set of resource requirements, wherein the modified set of resource requirements is associated with the business logic to modify the recipe; and deploy the modified recipe at one or more computing devices, wherein the modified recipe to facilitate management for one or more IoT devices at one or more locations.

Example 20 includes the subject matter of Example 19, wherein the mechanism is further to: search or generate the recipe, wherein the recipe is searched over a network including at least one of a cloud network, a proximity network, and the Internet; modify the recipe; and revise the set of resource requirements of the recipe, wherein to revise includes at least one of add one or more new resources to the set of resource requirements and remove or switch one or more existing resources of the set of resource requirements.

Example 21 includes the subject matter of Example 19, wherein the mechanism is further to discover one or more relevant resources based on the modified set of resource requirements.

Example 22 includes the subject matter of Example 19 or 21, wherein the mechanism is further to generate an order list of the one or more relevant resources, wherein the order list is generated based on criteria including at least one of proximity of the one or more relevant resources from each other or with the one or more IoT devices, one or more locations of the one or more relevant resources, one or more types of the one or more relevant resources, and one or more networks connecting the one or more relevant resources.

Example 23 includes the subject matter of Example 22, wherein the mechanism is further to prepare the business logic for deployment by facilitating the discovery module to reiterate a discovery process until the one or more relevant resources are discovered, wherein the modified recipe is deployed when the business logic is prepared for deployment.

Example 24 includes the subject matter of Example 19, wherein the one or more relevant resources comprise at least one of the one or more computing devices, the one or more IoT devices, one or more components of the one or more IoT devices, the one or more networks, and one or more communication protocols.

Example 25 includes the subject matter of Example 19, wherein the set of resource requirements comprises at least one of an input requirement, an output requirement, and a function requirement.

Example 26 includes the subject matter of Example 25, wherein the input requirement defines a first component of an IoT device, wherein the second requirement defines a second component of the IoT device, and the function requirement defines a relationship between first component and the second component.

Example 27 includes the subject matter of Example 19 or 25, wherein the mechanism is further to facilitate implementation of the recipe based on at least one of the input, output, and function requirements of the set of resource requirements.

Some embodiments pertain to Example 28 includes an apparatus comprising: means for receiving a recipe request for selecting a recipe relating to Internet of Things (IoT) services, wherein selecting includes at least one of searching the recipe and modifying the recipe; means for selecting the recipe, wherein the recipe includes a set of resource requirements and business logic; means for modifying the set of resource requirements, wherein the modified set of resource requirements is associated with the business logic to modify the recipe; and means for deploying the modified recipe at one or more computing devices, wherein the modified recipe to facilitate management for one or more IoT devices at one or more locations.

Example 29 includes the subject matter of Example 28, wherein the means for selecting further comprises: means for searching or means for generating the recipe, wherein the recipe is searched over a network including at least one of a cloud network, a proximity network, and the Internet; and means for modifying the recipe, wherein modifying includes revising the set of resource requirements of the recipe, wherein revising includes at least one of adding one or more new resources to the set of resource requirements and removing or switching one or more existing resources of the set of resource requirements.

Example 30 includes the subject matter of Example 28, further comprising means for discovering one or more relevant resources based on the modified set of resource requirements.

Example 31 includes the subject matter of Example 28 or 30, further comprising means for generating an order list of the one or more relevant resources, wherein the order list is generated based on criteria including at least one of proximity of the one or more relevant resources from each other or with the one or more IoT devices, one or more locations of the one or more relevant resources, one or more types of the one or more relevant resources, and one or more networks connecting the one or more relevant resources.

Example 32 includes the subject matter of Example 31, further comprising means for preparing the business logic for deployment by facilitating the discovery module to reiterate a discovery process until the one or more relevant resources are discovered, wherein the modified recipe is deployed when the business logic is prepared for deployment.

Example 33 includes the subject matter of Example 28, wherein the one or more relevant resources comprise at least one of the one or more computing devices, the one or more IoT devices, one or more components of the one or more IoT devices, the one or more networks, and one or more communication protocols.

Example 34 includes the subject matter of Example 28, wherein the set of resource requirements comprises at least one of an input requirement, an output requirement, and a function requirement.

Example 35 includes the subject matter of Example 34, wherein the input requirement defines a first component of an IoT device, wherein the second requirement defines a second component of the IoT device, and the function requirement defines a relationship between first component and the second component.

Example 36 includes the subject matter of Example 28 or 34, further comprising means for facilitating implementation of the recipe based on at least one of the input, output, and function requirements of the set of resource requirements.

Example 37 includes at least one machine-readable medium comprising a plurality of instructions, when executed on a computing device, to implement or perform a method as claimed in any of claims or examples 10-18.

Example 38 includes at least one non-transitory machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   reception circuitry to receive a recipe request for selecting a recipe relating to Internet of Things (IoT) services
      recipe selection circuitry to select the recipe, wherein the recipe includes a first set of resources and instructions associated with the first set of resources;
   resource abstraction circuitry to:
      identify a respective resource taxonomy for each of at least a portion of the resources included in the first set of resources; and
      modify the recipe to include the identified resource taxonomy; and
   deployment circuitry to deploy the modified recipe at one or more computing devices, wherein the modified recipe is to facilitate management for each of one or more IoT devices at one or more locations;
      wherein to facilitate management for each of the one or more IoT devices includes identifying a second set of resources associated with the respective IoT device and within the identified resource taxonomy; and
      wherein at least one of the resources included in the second set of resources includes a resource not included in the first set of resources.

2. The apparatus of claim 1, wherein the recipe selection circuitry comprises at least one of:
   search logic to search the recipe over a network including at least one of a cloud network, a proximity network, and the Internet; or
   generation logic to generate the recipe; and
   modification logic to facilitate modification of the recipe, wherein modifying includes revising the set of resource requirements of the recipe, wherein revising includes at least one of adding one or more new resources included in the second set of resources and removing or switching one or more existing resources included in the second set of resources.

3. The apparatus of claim 2, further comprising resource orchestration circuitry that includes a discovery module to discover at least one resource included in the second set of resources within the identified resource taxonomy.

4. The apparatus of claim 3, wherein the resource orchestration circuitry further comprises a binding module to generate the second set of resources based on criteria that include at least one of a proximity of the second resources to each other or to the one or more IoT devices, one or more locations of the second resources, one or more types of the second resources, and one or more networks connecting the second resources.

5. The apparatus of claim 4, wherein the binding module is further to cause the discovery module to reiterate a discovery process until the at least one resource included in the second set of resources is discovered, wherein the modified recipe is deployed by the deployment circuitry.

6. The apparatus of claim 1, wherein the first set of resources comprise at least one resource of a group that includes the one or more computing devices, the one or more IoT devices, one or more components of the one or more IoT devices, the one or more networks, and/or one or more communication protocols.

7. The apparatus of claim 1, wherein the second set of resources comprises at least one of an input requirement, an output requirement, and a function requirement.

8. The apparatus of claim 7, wherein the input requirement defines a first component of an IoT device, wherein the output requirement defines a second component of the IoT device, and wherein the function requirement defines a relationship between the first component and the second component.

9. The apparatus of claim 7, wherein instructions associated with the first set of resources further facilitate implementation of the recipe at each of the one or more IoT devices based on at least one of the input, output, and function requirements of the second set of resources.

10. A method comprising:
   receiving, via reception circuitry, a recipe request for selecting a recipe relating to Internet of Things (IoT) services;
   selecting, via recipe selection circuitry, the recipe, wherein the recipe includes a first set of resources and instructions associated with the first set of resources;
   identifying, via resource abstraction circuitry, a respective resource taxonomy for each of at least a portion of the resources included in the first set of resources; and
   modifying, via the recipe to include the identified resource taxonomy; and
   deploying, via deployment circuitry, the modified recipe at one or more computing devices, wherein the modified recipe is for facilitating management for each of one or more IoT devices at one or more locations;
      wherein facilitating management for each of the one or more IoT devices includes identifying a second set of resources associated with the respective IoT device and within the identified resource taxonomy; and
      wherein at least one of the resources included in the second set of resources includes a resource not included in the first set of resources.

11. The method of claim 10, wherein selecting the recipe further comprises:
   searching over a network including at least one of a cloud network, a proximity network, and the Internet; or
   generating the recipe; and
   modifying the recipe, wherein modifying includes revising the set of resource requirements of the recipe, wherein revising includes at least one of adding one or more new resources to the second set of resources using the identified resource taxonomy and removing or switching one or more existing resources from the second set of resources.

12. The method of claim 10, further comprising discovering at least one resource included in the second set of resources within the identified resource taxonomy.

13. The method of claim 12, wherein generating the second set of resources includes generating the order list based on criteria that include at least one of proximity of the second resources from each other or with the one or more IoT devices, one or more locations of the second resources, one or more types of the second resources, and one or more networks connecting the second resources.

14. The method of claim 13, further comprising causing the discovery module to reiterate a discovery process until the at least one resource included in the second set of resources are discovered, wherein the modified recipe is deployed by the deployment circuitry.

15. The method of claim 10, wherein the first set of resources comprise at least one resource of a group that includes the one or more computing devices, the one or more IoT devices, one or more components of the one or more IoT devices, the one or more networks, and/or one or more communication protocols.

16. The method of claim 10, wherein the second set of resources comprises at least one of an input requirement, an output requirement, and a function requirement.

17. The method of claim 16, wherein the input requirement defines a first component of an IoT device, wherein the output requirement defines a second component of the IoT device, and wherein the function requirement defines a relationship between the first component and the second component.

18. The method of claim 16, further comprising facilitating implementation of the recipe at each of the one or more IoT devices based on at least one of the input, output, and function requirements of the second set of resources.

19. A non-transitory machine-readable storage medium comprising a plurality of instructions stored thereon, the instructions when executed on a computing device, cause the computing device to:
  receive, via reception circuitry of the computing device, a recipe request for selecting a recipe relating to Internet of Things (IoT) services;
  select the recipe via recipe selection circuitry of the computing device, wherein the recipe includes a first set of resources and instructions associated with the first set of resources;
  identify via resource abstraction circuitry a respective resource taxonomy for each of at least a portion of the resources included in the first set of resources; and
  modify via the resource abstraction circuitry the recipe to include the identified resource taxonomy; and
  deploy, via deployment circuitry of the computing device, the modified recipe at one or more computing devices, wherein the modified recipe is to facilitate management for each of one or more IoT devices at one or more locations;
  wherein to facilitate management for each of the one or more IoT devices includes identifying a second set of resources associated with the respective IoT device and within the identified resource taxonomy; and
  wherein at least one of the resources included in the second set of resources includes a resource not included in the first set of resources.

20. The non-transitory machine-readable medium of claim 19, wherein the computing device is further to:
  search for the recipe over a network including at least one of a cloud network, a proximity network, and the Internet; or
  generate the recipe; and
  modify the recipe to
  revise the set of resource requirements, wherein to revise includes at least one of add one or more new resources to the second set of resources using the identified resource taxonomy and remove or switch one or more existing resources from the second set of resources.

21. The non-transitory machine-readable medium of claim 19, wherein the computing device is further to discover at least one resource included in the second set of resources within the identified resource taxonomy.

22. The non-transitory machine-readable medium of claim 21, wherein to generate the second set of resources includes to generate the order list based on criteria including at least one of proximity of the second resources from each other or with the one or more IoT devices, one or more locations of the second resources, one or more types of the second resources, and one or more networks connecting the second resources.

23. The non-transitory machine-readable medium of claim 22, wherein the computing device is further to cause the discovery module to reiterate a discovery process until the at least one resource included in the second set of resources are discovered, wherein the modified recipe is deployed by the deployment circuitry.

24. The non-transitory machine-readable medium of claim 19, wherein the first set of resources comprise at least one resource of a group that includes the one or more computing devices, the one or more IoT devices, one or more components of the one or more IoT devices, the one or more networks, and/or one or more communication protocols,
  wherein the second set of resources comprises at least one of an input requirement, an output requirement, and a function requirement; and
  wherein the input requirement defines a first component of an IoT device, wherein the output requirement defines a second component of the IoT device, and wherein the function requirement defines a relationship between the first component and the second component.

25. The non-transitory machine-readable medium of claim 24, wherein the computing device is further to facilitate implementation of the recipe at each of the one or more IoT devices based on at least one of the input, output, and function requirements of the second set of resources.

* * * * *